US012469989B2

(12) United States Patent
Poulsen et al.

(10) Patent No.: US 12,469,989 B2
(45) Date of Patent: Nov. 11, 2025

(54) INSULATION DISPLACEMENT CONTACT CAPABLE OF SECURELY TERMINATING A WIDE RANGE OF ELECTRICAL CONDUCTORS

(71) Applicant: Leviton Manufacturing Co., Inc., Melville, NY (US)

(72) Inventors: Jeffrey A. Poulsen, Bothell, WA (US); Charles R Bragg, Bothell, WA (US)

(73) Assignee: LEVITON MANUFACTURING CO., INC., Melville, NY (US)

( * ) Notice: Subject to any disclaimer, the term of this patent is extended or adjusted under 35 U.S.C. 154(b) by 505 days.

(21) Appl. No.: 17/820,257

(22) Filed: Aug. 17, 2022

(65) Prior Publication Data

US 2024/0063559 A1 Feb. 22, 2024

(51) Int. Cl.
*H01R 4/2425* (2018.01)

(52) U.S. Cl.
CPC .................................. *H01R 4/2425* (2013.01)

(58) Field of Classification Search
None
See application file for complete search history.

(56) References Cited

U.S. PATENT DOCUMENTS 3,950,062 A * 4/1976 Reavis, Jr. ........... H01R 4/2425 439/408
4,370,009 A * 1/1983 Dola .................... H01R 4/2425 439/177
4,607,907 A 8/1986 Bogursky
4,749,365 A * 6/1988 Magnifico ............ H01R 4/2425 439/396
4,795,379 A 1/1989 Sasaki et al.
4,952,178 A 8/1990 Beer
(Continued)

FOREIGN PATENT DOCUMENTS

| | | | |
|---|---|---|---|
| CN | 101689736 | B | 6/2013 |
| TW | M466396 | U | 11/2013 |
| WO | 2016/093993 | A1 | 6/2016 |

OTHER PUBLICATIONS

International Search Report and Written Opinion received for PCT Application Serial No. PCT/US2021/07899, dated Jan. 31, 2022, 5 pages.

(Continued)

*Primary Examiner* — Felix O Figueroa
(74) *Attorney, Agent, or Firm* — Amin, Turocy & Watson, LLP

(57) ABSTRACT

An insulation displacement contact (IDC) is capable of securely terminating wires having a wide range of diameters. The IDC is also designed to withstand repeated terminations of wires having diameters at the large end of the supported size range while remaining capable of securely terminating wires having diameters at the small end of the range. To these ends, the IDC comprises two or more distinct flex regions. At least one of the flex regions has an associated mechanical stop that limits the degree of deformation that can be applied to that region as a wire is being terminated on the IDC. If the diameter of the wire being terminated on the IDC is large enough to deflect the first flex region to the end of its deflection range, the mechanical stop is engaged, causing further deflection to be transferred to the next flex region.

20 Claims, 5 Drawing Sheets

(56) References Cited

U.S. PATENT DOCUMENTS

| | | | | |
|---|---|---|---|---|
| 4,973,273 | A | 11/1990 | DePriest | |
| 5,167,544 | A | 12/1992 | Brinkman et al. | |
| 5,281,175 | A | 1/1994 | Chupak et al. | |
| 5,458,513 | A | 10/1995 | Matsuoka | |
| 5,582,519 | A | 12/1996 | Buchter | |
| 5,672,084 | A | 9/1997 | Feldman | |
| 5,688,143 | A | 11/1997 | McHugh et al. | |
| 5,827,087 | A * | 10/1998 | Yamasaki | H01R 4/2425 439/398 |
| 6,116,926 | A | 9/2000 | Ortega et al. | |
| 6,217,356 | B1 | 4/2001 | Davis et al. | |
| 6,238,238 | B1 | 5/2001 | Hwang et al. | |
| 6,276,958 | B1 | 8/2001 | Chih | |
| 6,375,488 | B1 | 4/2002 | Noro | |
| 6,488,549 | B1 | 12/2002 | Weller et al. | |
| 6,908,331 | B2 * | 6/2005 | Brown | H01R 4/26 439/395 |
| 6,932,642 | B2 | 8/2005 | Beer et al. | |
| 7,090,534 | B2 | 8/2006 | Wu et al. | |
| 7,341,487 | B2 | 3/2008 | Wu | |
| 7,462,071 | B1 | 12/2008 | Wu | |
| 7,632,155 | B1 | 12/2009 | Wu | |
| 7,789,708 | B2 | 9/2010 | Laurx et al. | |
| 8,083,538 | B2 * | 12/2011 | Ofenloch | H01R 4/2462 439/404 |
| 8,398,427 | B2 | 3/2013 | Wu | |
| 8,708,733 | B2 * | 4/2014 | Parrish | H01R 4/242 439/395 |
| 8,714,994 | B2 | 5/2014 | Daily et al. | |
| 8,777,664 | B2 | 7/2014 | Gui et al. | |
| 8,784,134 | B2 | 7/2014 | Wu et al. | |
| 8,894,441 | B2 | 11/2014 | Wu et al. | |
| 8,979,574 | B2 | 3/2015 | Daily, Jr. et al. | |
| 9,083,091 | B1 * | 7/2015 | Ravlich | H01R 4/2425 |
| 9,231,314 | B2 | 1/2016 | Peterson et al. | |
| 9,231,316 | B2 * | 1/2016 | Hemmi | H01R 4/2425 |
| 9,377,794 | B1 | 6/2016 | Dwelley et al. | |
| 9,620,910 | B2 | 4/2017 | Chen | |
| 9,673,542 | B1 | 6/2017 | Decker et al. | |
| 9,972,932 | B2 | 5/2018 | Copper et al. | |
| 10,103,465 | B2 | 10/2018 | Amini et al. | |
| 10,418,763 | B2 | 9/2019 | Tziviskos et al. | |
| 10,453,589 | B1 | 10/2019 | Conaty | |
| 10,658,778 | B2 | 5/2020 | Hanyu | |
| 10,700,455 | B1 | 6/2020 | Shen | |
| 11,081,846 | B2 | 8/2021 | Delpier et al. | |
| 11,476,623 | B2 | 10/2022 | Bragg et al. | |
| 2005/0221658 | A1 | 10/2005 | Hiramoto et al. | |
| 2005/0272299 | A1 | 12/2005 | Ploesser | |
| 2007/0288125 | A1 | 12/2007 | Quaratiello | |
| 2010/0068916 | A1 | 3/2010 | Chen | |
| 2014/0115354 | A1 | 4/2014 | Jabbaz et al. | |
| 2015/0340818 | A1 | 11/2015 | Scherer et al. | |
| 2016/0072200 | A1 | 3/2016 | Sabo | |
| 2018/0048082 | A1 | 2/2018 | Sabo | |
| 2019/0312439 | A1 | 10/2019 | Cottrell et al. | |
| 2020/0153174 | A1 | 5/2020 | Curtis et al. | |
| 2020/0227843 | A1 | 7/2020 | Watkins et al. | |
| 2020/0382338 | A1 | 12/2020 | Siergiej et al. | |
| 2021/0126382 | A1 | 4/2021 | Randolph et al. | |
| 2021/0242623 | A1 | 8/2021 | Patel et al. | |
| 2021/0280996 | A1 | 9/2021 | Liu et al. | |
| 2021/0336653 | A1 | 10/2021 | Klein | |
| 2021/0391653 | A1 | 12/2021 | Berg | |

OTHER PUBLICATIONS

Non-Final Office Action received for U.S. Appl. No. 17/090,335 dated Mar. 3, 2022, 34 pages.

Final Office Action received for U.S. Appl. No. 17/090,335 dated May 25, 2022, 8 pages.

Legrady, Janos "A New Type of Very High Reliability Torsion IDC Which Can Accept A Large Range of Wire Gauges", Zierick Manufacturing Corporation, 8 pages.

Non-Final Office Action received for U.S. Appl. No. 17/930,167 dated Apr. 4, 2024, 31 pages.

International Search Report and Written Opinion received for PCT Application Serial No. PCT/US2023/071653 dated Nov. 12, 2023, 9 pages.

Extended European Search Report received for European Patent Application Serial No. 21890315.1 dated Sep. 19, 2024, 8 pages.

Notice of Allowance received for U.S. Appl. No. 17/930,167 dated Jul. 24, 2024, 33 pages.

Notice of Allowance received for U.S. Appl. No. 17/930,167 dated Aug. 16, 2024, 3 pages.

* cited by examiner

INSULATION DISPLACEMENT CONTACT CAPABLE OF SECURELY TERMINATING A WIDE RANGE OF ELECTRICAL CONDUCTORS

TECHNICAL FIELD

The disclosed subject matter relates generally to insulation displacement contacts, or IDCs.

BACKGROUND

Insulation displacement contacts, or IDCs, are used in a variety of data connectivity applications to electrically terminate insulated wires to other conductors or conductive traces. IDCs typically comprise two electrically conductive parallel blades that form a gap therebetween for receiving an insulated wire. The blades cut through a wire's insulation as the wire is inserted into the gap, and make electrical contact with the conductor (or conductors) of the wire through the insulation displaced by the blades, thereby electrically connecting the conductor of the wire with another conductor or trace that may be terminated to the IDC. IDCs are often found in multi-wire connectors such as ribbon cable connectors or registered jack 45 (RJ45) connectors, on printed circuit boards, or in other such connectivity contexts.

Due to the limited elasticity of the IDC blades, current IDC technology is limited in the range of wire diameter that can be securely terminated. IDCs are also susceptible to weakening with repeated use due to deformation fatigue incurred by the blades of the IDC.

The above-described deficiencies of IDCs are merely intended to provide an overview of some of the problems of current technology and are not intended to be exhaustive. Other problems with the state of the art, and corresponding benefits of some of the various non-limiting embodiments described herein, may become further apparent upon review of the following detailed description.

SUMMARY

The following presents a simplified summary of the disclosed subject matter in order to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

Various embodiments described herein relate to an IDC capable of securely terminating various conductors having a wide range of diameters. The IDC is also capable of withstanding repeated terminations of the widest conductor diameters while still being capable of securely terminating the smallest conductor diameters. To these and other ends, the IDC described herein is designed to include two or more distinct deformation or flex regions. As the IDC blades are spread apart during termination of a wire, the mechanical stress or deformation absorbed by the blades is sequenced through the flex regions in a staged manner. To achieve this, at least one of the flex regions includes a mechanical stop on each of the two IDC blades. The mechanical stop limits the amount of deformation that can take place within that flex region, thereby ensuring that the elastic limits of the flex region are not exceeded. When the mechanical stops are engaged, further deflection of the IDC blades is absorbed by the next flex region.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description may include additional or alternative embodiments beyond those described in this summary.

DETAILED DESCRIPTION

Figures 1A, 1B, 1C:
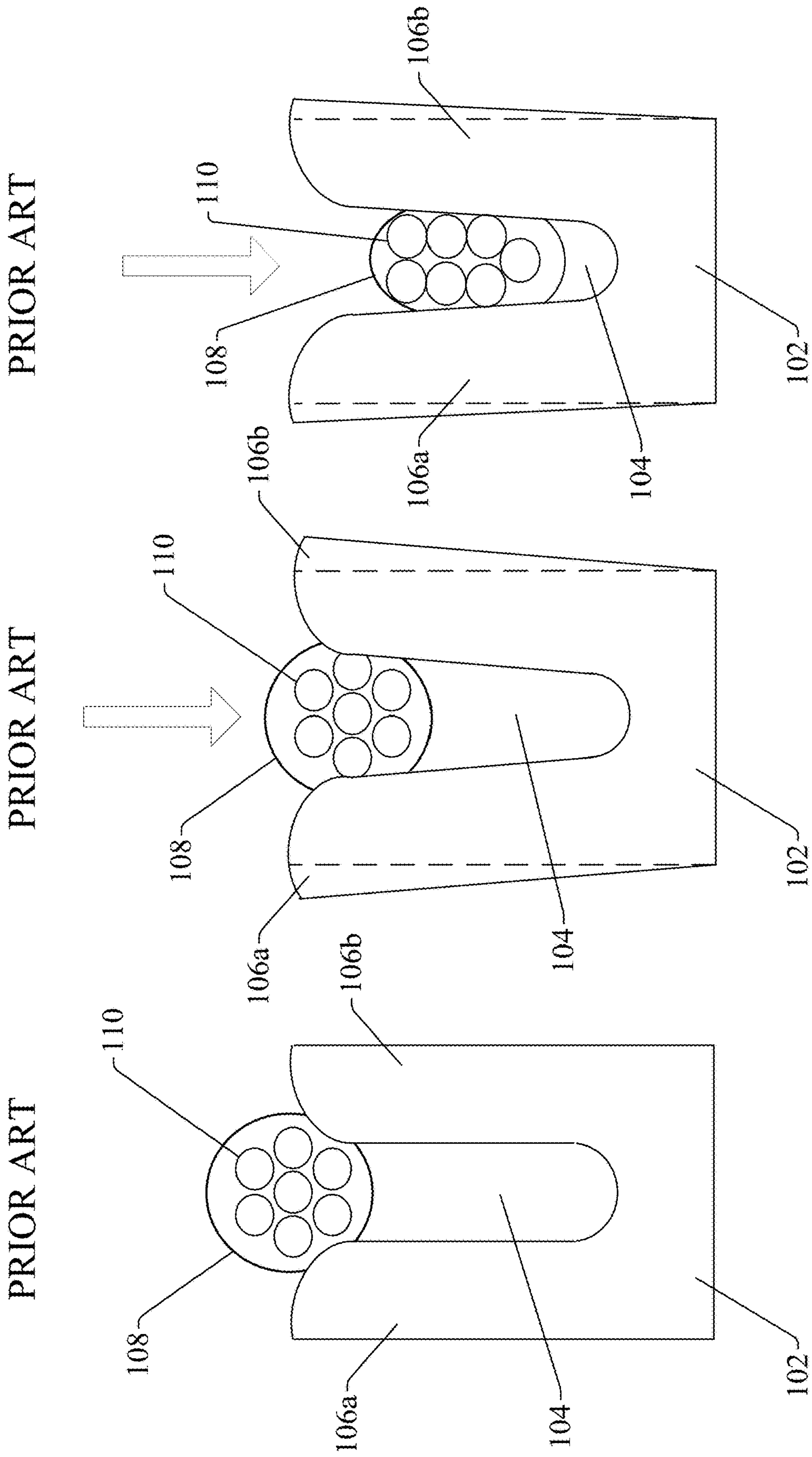
FIG. 1*a* is a front view of an example IDC illustrating an initial alignment of a wire.
FIG. 1B is a front view of the example IDC illustrating the wire being pressed into the IDC's slot.
FIG. 1*c* is a front view of the example IDC illustrating the wire fully terminated into the IDC.

The subject disclosure is now described with reference to the drawings wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Some reference numbers used herein to label illustrated components are suffixed with letters to delineate different instances of a same or similar component. In general, if a reference number without an appended letter is used within this disclosure, the descriptions ascribed to the reference number are to be understood to be applicable to all instances of that reference number with or without an appended letter unless described otherwise.

FIGS. 1*a*-1*c* are front views of an example IDC 102 depicting termination of a wire 108 on the IDC 102. IDC 102 is an electrically conductive contact comprising two parallel blades 106*a* and 106*b* that define a slot 104 therebetween. IDC 102 may be one of several IDCs arranged in a row within a data cable connector (such as a ribbon cable connector, RJ45 connector, or other such connectors), mounted to a circuit board, or mounted in another type of connectivity installation.

FIG. 1*a* depicts an initial alignment of a wire 108 with the IDC 102 in preparation for terminating the wire 108 to the IDC 102. In this example, wire 108 is a multi-strand wire comprising multiple copper conductors 110 encased within the wire's insulation. However, IDC 102 can also terminate single strand wires (not shown) comprising only a single copper conductor encased within the wire's insulation. To terminate the wire 108 to the IDC 102, the wire 108 is aligned over the slot 104 between the two blades 106*a* and 106*b*. The wire 108 is then pressed into the slot 104 as shown in FIG. 1B, causing the conductive blades 106*a* and 106*b* to slice through the wire's insulation. As the wire 108 is pressed into the slot 104, the blades 106*a* and 106*b* deflect outward to accommodate the wire's diameter. FIG. 1*c* depicts the wire 108 fully terminated on the IDC 102, with the blades 106*a* and 106*b* penetrating the wire's insulation and making electrical contact with at least a subset of the wire's conductors 110.

In the case of multi-strand wire 108, the pressure applied to the wire 108 by the blades 106*a* and 106*b* may compress the conductors 110 into a narrower arrangement at the termination location. In the example depicted in FIG. 1*c*, blade compression has caused the arrangement of conductors 110 to reposition from a six-around-one arrangement to an arrangement of stacked pairs (with a single strand at the bottom of the arrangement). This reorientation of the conductors 110 can be unpredictable, and in the most extreme case can result in a vertical stacking of single strands. Because of this unpredictability, as well as the relatively small diameters of the individual conductors 110 that make up a multi-strand wire 108, conventional IDC designs have difficulty reliably terminating stranded wire. To effectively terminate these small conductors 110, the width of the slot 104 with the wire 108 inserted needs to be as small as 6 to 8 mils (where 1 mil is equal to 0.001 inches) and still provide significant force against the conductors to make an effective connection. The necessity to keep the slot 104 narrow in order to reliably terminate multi-strand wire limits the IDCs ability to accommodate wires having larger diameters.

To address these and other issues, one or more embodiments described herein provide an IDC capable of securely terminating wires having a wide range of diameters. The IDC is also designed to withstand repeated terminations of wires having diameters at the large end of the supported size range while remaining capable of securely terminating wires having diameters at the small end of the range. To these ends, the IDC comprises two or more distinct flex regions. At least one of the flex regions has an associated mechanical stop that limits the degree of deformation that can be applied to that region as a wire is being terminated on the IDC. If the diameter of the wire being terminated on the IDC is large enough to deflect the first flex region to the end of its deflection range, the mechanical stop is engaged, causing further deflection to be transferred to the next flex region. This configuration allows the IDC gap to have a narrow resting width in order to accommodate small conductors (or an extreme compression of a multi-strand wire), while also permitting one or more additional stages of deflection to accommodate larger wire diameters. These additional stages of deflection are triggered when wires of larger diameters are terminated on the IDC.

Figure 2B:
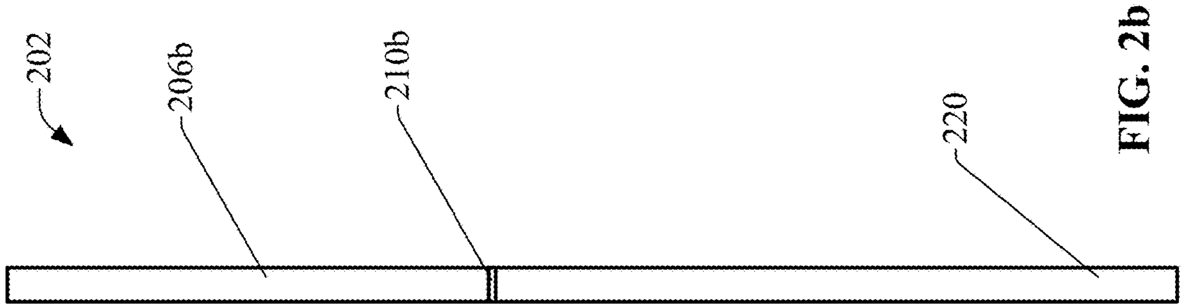
FIG. 2*b* is a side view of the example IDC.
Figure 2A:
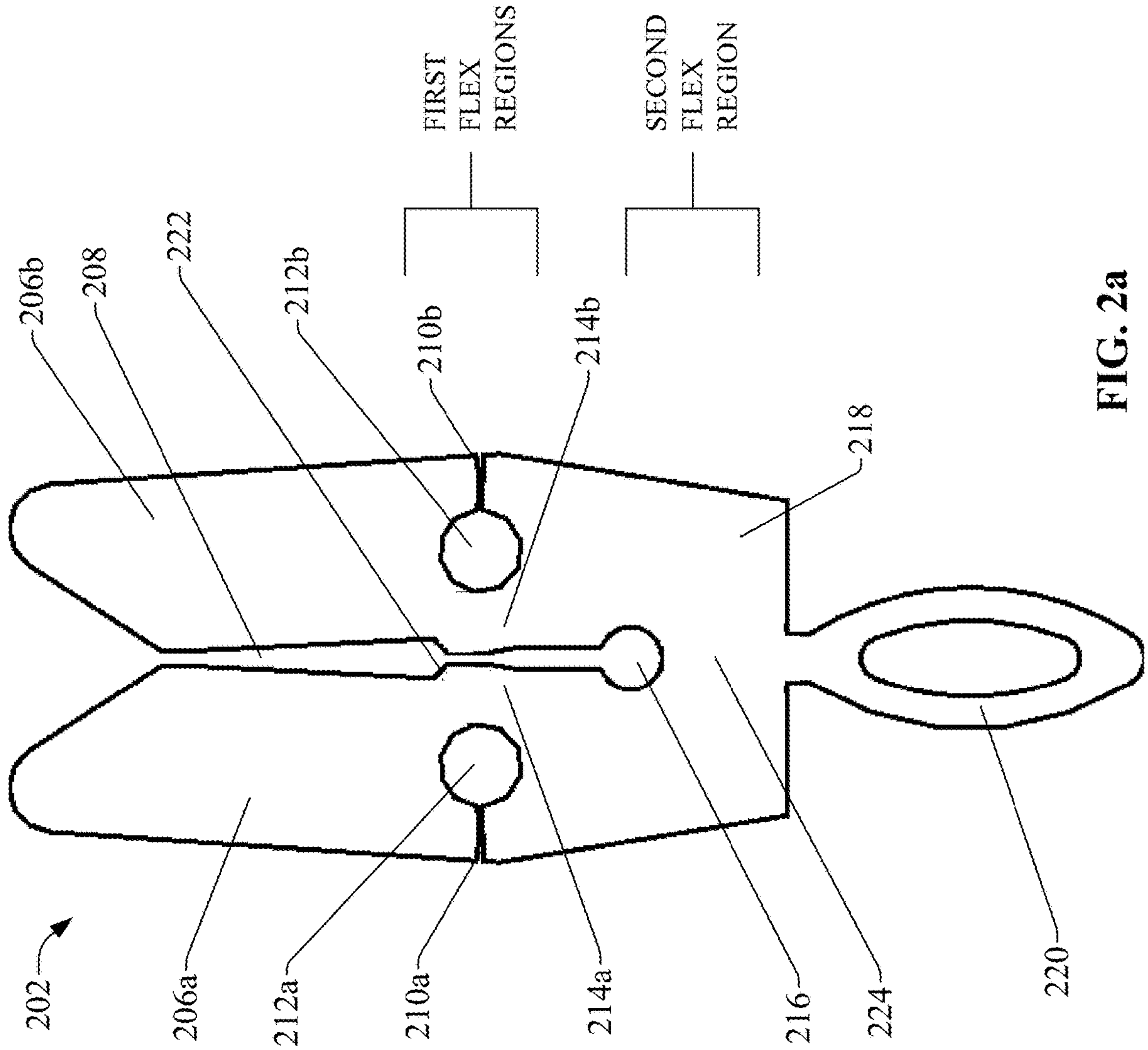
FIG. 2*a* is a front view of an example IDC that uses staged blade deflection to accommodate a wide range of wire diameters.

FIGS. 2*a* and 2*b* are a front view and a side view, respectively, of an example IDC 202 that uses staged blade deflection to accommodate a wide range of wire diameters according to one or more embodiments. IDC 202 can comprise a uniform piece of electrically conductive material having a substantially planar profile. IDC 202 comprises two blades 206*a* and 206*b* that extend upward from a base region 218 and form a slot 208 therebetween for accommodating wires of various diameters. A termination structure 220 is formed on the bottom of the IDC 202—extending downward from the base region 218—and acts as a termination point for a conductor or wire that will be electrically connected to any insulated wires that are terminated in the IDC's slot 208.

In contrast to IDC 102 described above in connection with FIGS. 1*a*-1*c*, IDC 202 is designed such that the blades 206*a* and 206*b* each include at least two distinct flex regions. In the example design depicted in FIGS. 2*a* and 2*b*, each blade 206*a* and 206*b* comprises two flex regions. The first flex region of each blade 206 is located part way along the length of the blade 206 between the base region and the top of the blade 206; e.g., at a location within the lower half of the blade's length. This first flex region is created by the inclusion of a round hole 212 formed through blade 206 and a gap 210 that traverses from the perimeter of the hole 212 to the outer edge of the blade 206. This configuration creates a flexible region 214 on each blade 206 comprising the portion of the blade 206 between the hole 212 and the inner edge of the blade 206, with the gap 210 permitting a limited degree of deformation of the flexible region 214.

Whereas each blade 206*a* and 206*b* has its own, individual first flex region—regions 214*a* and 214*b*, respectively—the second flex region 224 is a single flex region that is common to both blades 206*a* and 206*b*. The second flex region 224 is located on the base region 218 of the IDC 202 at the meeting point of the two blades 206*a* and 206*b*, and is created by the inclusion of another round hole 216 formed at the bottom of the slot 208 between the two blades 206*a* and 206*b*. As will be described in more detail below, the deformation stress caused by deflection of the blades 208 is staged sequentially through the first and second flex regions as the blades 206*a* and 206*b* are spread apart by a wire. When the first flex regions 214*a*, 214*b* have reached the end of their permitted degree of deformation, as determined by the width of the gaps 210*a* and 210*b*, further deformation of the blades 206 is transferred to the second flex region 224 such that the blades 206 pivot about the base region 218.

The width of the slot 208 while the IDC 202 is at rest can be designed to be sufficiently small (e.g., approximately 3-6 mils) to ensure secure termination of small wires (e.g., approximately 6 mils in diameter), and also to reliably accommodate scenarios in which conductors of a multi-strand wire are compressed into a narrower, vertically stacked arrangement during termination (as illustrated in FIG. 1*c*). In the illustrated example, the upper portions of the blades 206*a* and 206*b* (that is, the portions above the first flex regions 214*a* and 214*b*) are slanted inward while at rest, yielding a slot 208 whose width tapers toward the top of the IDC 202. Protruding formations 222 on the inner edges of the blades 206*a* and 206*b* at locations near the first flex regions 214*a* and 214*b* prevent the wire from being pushed to the bottom of the slot 208 and into the hole 216.

Behavior of the IDC 202 as a wire is being terminated is now described. FIG. 3*a* is a front view of the IDC 202 in its resting position with a wire 302 aligned for termination. Wire 302 may be a single strand or multi-strand wire. In the illustrated embodiment, the top edges of the blades 206*a* and 206*b* are slanted inward toward the slot 208, forming a substantially V-shaped entryway that assists in guiding the wire 302 into the slot 208. Once aligned between the blades

206*a* and 206*b*, the wire 302 can be pressed into the slot 208 between the blades 206*a* and 206*b*.

Figure 3B:
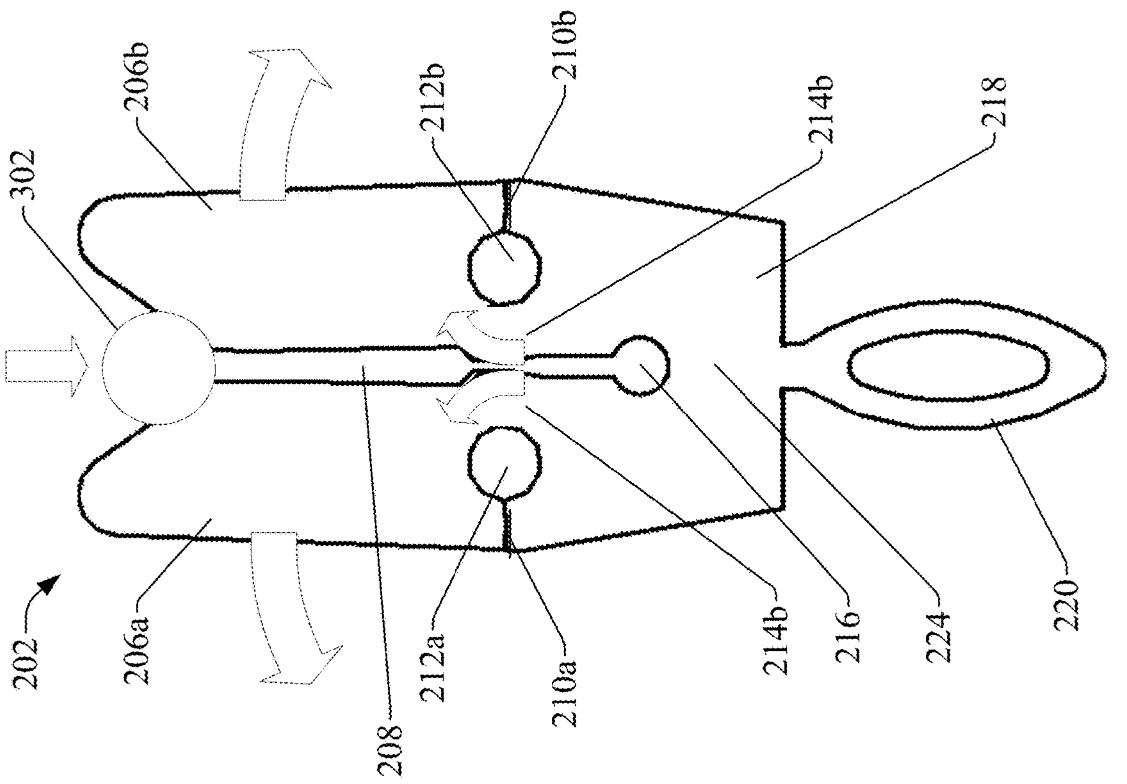
FIG. 3*b* is a front view of the IDC as the wire begins entering the slot, depicting a first stage of blade deflection.
Figure 3A:
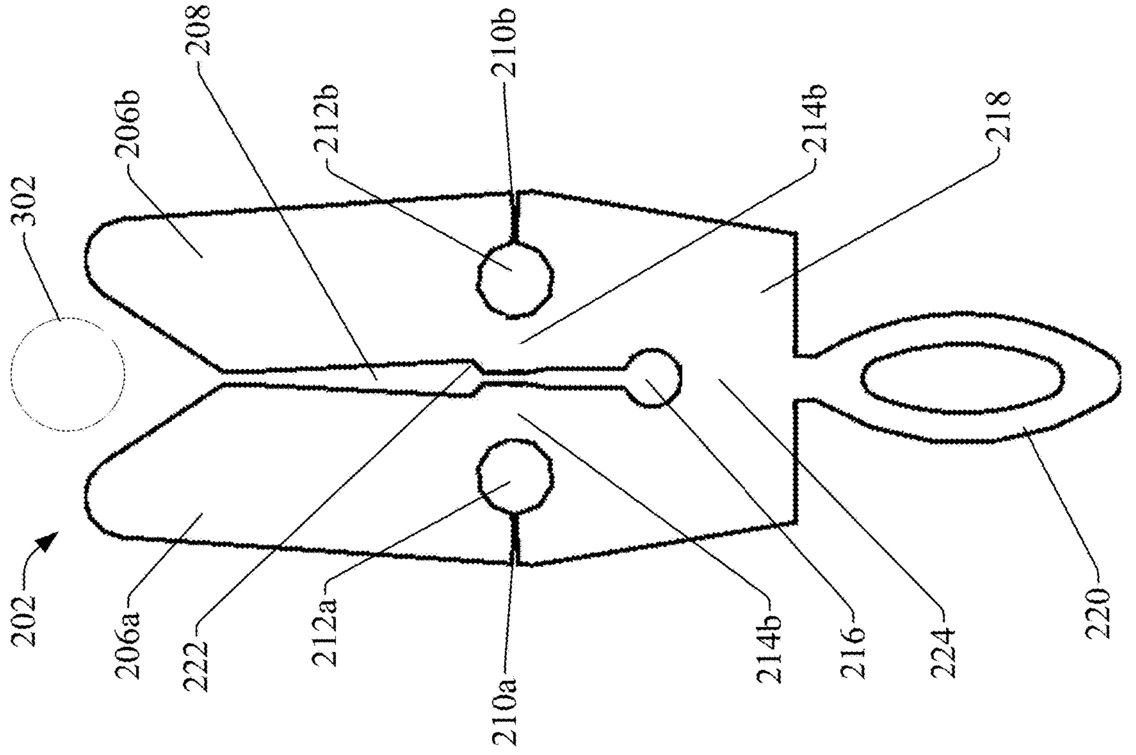
FIG. 3*a* is a front view of the IDC in its resting position with a wire aligned for termination.

FIG. 3*b* is a front view of the IDC 202 as the wire 302 begins entering the slot 208. As the wire 302 is inserted into the slot 208, the upper portions of the blades 206*a* and 206*b*—that is, the portions of the blades 206*a* and 206*b* above the first flex regions 214*a* and 214*b*—are pushed outward by the wire 302, causing these upper portions to pivot about the first flex regions 214*a* and 214*b*. During this first stage of the wire termination sequence, most or all of the blade deflection stress is absorbed by the first flex regions 214*a* and 214*b*, with little or no deflection occurring within the second flex region 224. In the example embodiment depicted in FIGS. 3*a* and 3*b*, the upper portions of the blades 206*a* and 206*b* are slanted inward while at rest (see FIG. 3*a*) and are pushed toward a more parallel orientation as the wire 302 is pushed into the slot 208 (see FIG. 3*b*).

The widths of the gaps 210*a*, 210*b* formed on the blades 206*a*, 206*b* determine the maximum degree of deformation permitted by the first flex regions 214*a*, 214*b*. As the upper portions of the blades 206*a*, 206*b* are deflected outward by the wire 302, the facing edges of the gaps 210*a*, 210*b*— that is, the edges that define the two sides of each gap 210, and which face each other across the gap 210—are moved closer together. If the diameter of the wire 302 is sufficiently small, the deflection of the blades 206*a* and 206*b* will not be sufficient to cause the facing edges of the gaps 210*a* and 210*b* to contact one another even when the wire 302 is pressed fully into the slot 208, and deflection will not be transferred from the first flex region 214 to the second flex region 224. In the example depicted in FIGS. 3*a* and 3*b*, however, the wire 302 has a larger diameter that causes the blades 206*a* and 206*b* to deflect to the maximum deflection limits permitted by the first flex regions 214*a* and 214*b*, which is reached when the facing edges of the gaps 210*a* and 210*b* come into contact with each other.

Figure 3C:
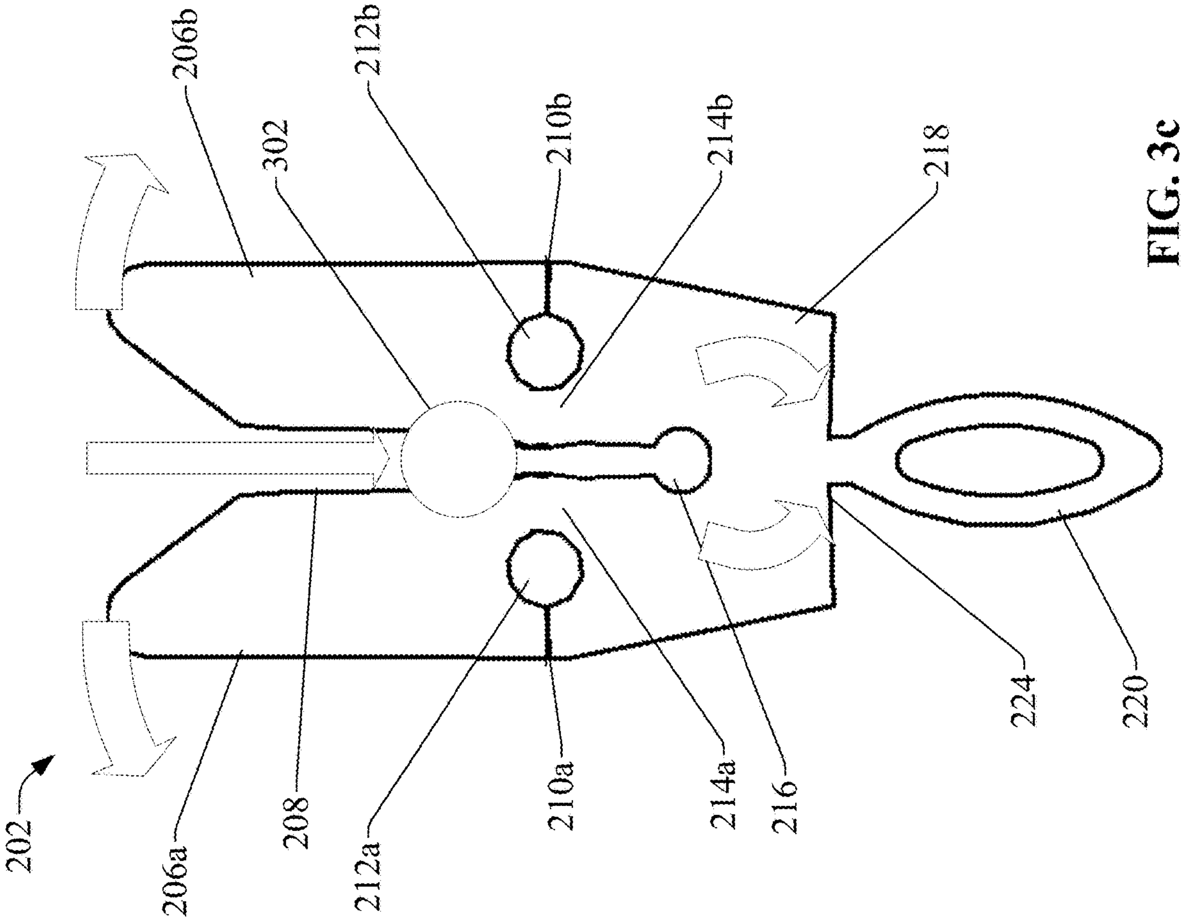
FIG. 3*c* is a front view of the IDC as the wire is inserted further into the slot, depicting a second stage of blade deflection.

The facing edges of the gaps 210*a* and 210*b* act as mechanical stops for the first flex regions 214*a*, 214*b*. If the diameter of the wire 302 is large enough to exceed the deflection capacity of the first flex regions 214*a*, 214*b*, as in the scenario depicted in FIG. 3*b*, these mechanical stops are engaged and further deflection of the blades 206*a* and 206*b* is transferred to the second flex region 224. FIG. 3*c* is a front view of the IDC 202 as the wire 302 is inserted further into the slot 208 while the mechanical stops are engaged. As illustrated in this figure, while the mechanical stops on the respective blades 206*a* and 206*b* are engaged (that is, gaps 210*a* and 210*b* are closed), further outward deflection of the blades 206*a* and 206*b* by the wire 302 is absorbed by the second flex region 224, such that the blades 206*a*, 206*b* pivot about the second flex region 224 rather than the first flex regions 214*a* and 214*b*. In the example embodiment depicted in FIGS. 3*a*-3*c*, the depth to which the wire 302 can be pushed into the slot 208 is limited by the protruding formations 222 (see FIGS. 2*a* and 3*a*) on the inner edges of the blades 206*a* and 206*b*, which prevent the wire 302 from being pressed into the hole 216 at the bottom of the slot 208.

Although the example IDC 202 illustrated in FIGS. 2*a*-3*c* depict only a first flex region 214 on each blade 206*a* and 206*b* and a common second flex region 224 in the base region 218, some embodiments may include additional flex regions along the lengths of the blades 206*a* and 206*b*, thereby increasing the number of flex stages and potentially allowing for greater wire diameters. For example, whereas each blade 206*a*, 206*b* in the illustrated examples incorporates a single hole 212*a*, 212*b* and associated gap 210*a*, 210*b*, in other embodiments each blade 206 may incorporate a second hole 212 and associated second gap 210 (defining a second mechanical stop) above each illustrated hole 212*a*, 212*b* and gap 210*a*, 210*b*. This additional flex region can act as the first flex region, which absorbs the initial deformation during wire termination for diameters up to the deformation capacity of this first flex region. If the diameter of the wire being terminated exceeds the deformation limit of this first flex region, the mechanical stop for that region is engaged and further displacement of the blades is transferred to the next flex region along the blade's length. If the mechanical stops for this next flex region are engaged, further blade displacement is absorbed by the lower-most flex region at the base region 218. Any number of flex regions can be incorporated along the lengths of the blades 206 in this manner without departing from the scope of one or more embodiments. The sequential staging of the flex regions ensures that only one flex region on each blade (or the lower-most flex region) is experiencing active deformation at any given time during wire termination.

In another example embodiments, one of the two blades 206*a* or 206*b* may be designed with no flex regions other than the common flex region located in the base region 218, while the other blade 206*a* or 206*b* includes one or more flex regions. By this arrangement, the blade 206 without flex regions remains relatively stationary as a wire 302 is being terminated, while the blade 206 including the one or more flex regions assumes most or all of the deflection.

The design of IDC 202 described herein can accommodate a wider range of wire diameters relative to conventional IDCs, such as IDC 102 depicted in FIGS. 1*a*-1*c*, while ensuring a reliable electrical connection across all supported diameters. The sequential staging of the multiple flex regions can also prevent deformation fatigue at any given flex region, since the maximum amount of deformation experienced by the first flex regions 214*a*, 214*b* is limited by the mechanical stops, and the second flex region 224 only experiences deformation when the wire diameter exceeds the maximum flex capacity of the first flex region. The IDC design can minimize deformation stress at any given point on the IDC blades, even in the case of larger wire diameters, while maintaining a compact form factor.

Figure 4:
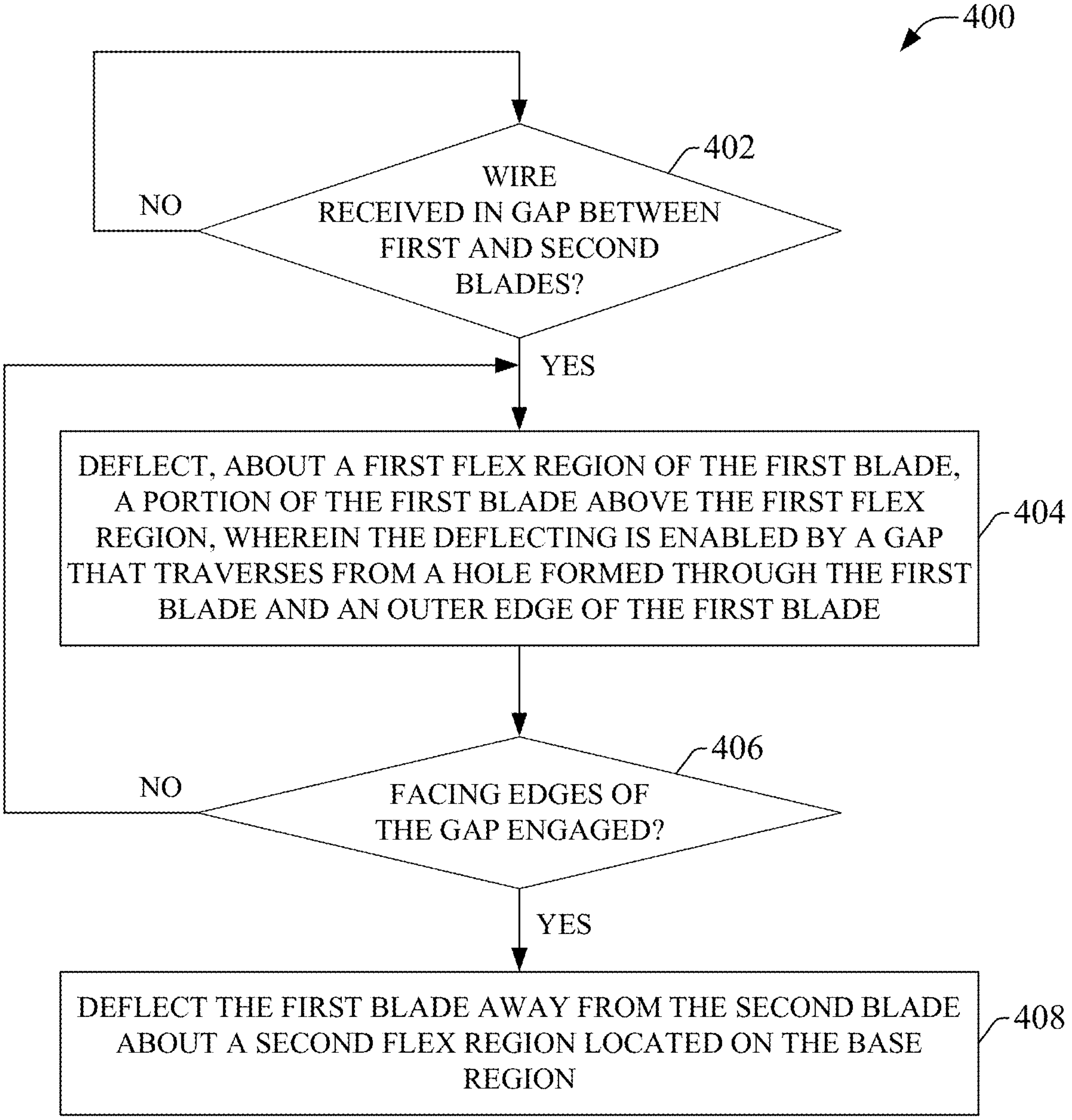
FIG. 4 is a flowchart of an example methodology for operating an IDC having at least two flex regions.

FIG. 4 illustrates a methodology in accordance with one or more embodiments of the subject application. While, for purposes of simplicity of explanation, the methodology shown herein are described as a series of steps, it is to be understood and appreciated that the subject innovation is not limited by the order of steps, as some steps may, in accordance therewith, occur in a different order and/or concurrently with other steps from that shown and described herein. For example, those skilled in the art will understand and appreciate that a methodology could alternatively be represented as a series of interrelated states or events, such as in a state diagram. Moreover, not all illustrated steps may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 4 illustrates an example methodology 400 for using an information displacement contact having at least two flex regions. Initially, at 402, a determination is made as to whether a wire is received in the gap between the first and second blades of the IDC. If so, the methodology proceeds to step 404, where a portion of the first blade above a first flex region of the first blade deflects about the first flex region. The deflecting is enabled by a gap that traverses from a hole formed through the first blade and an outer edge of the first blade.

At 406, a determination is made as to whether the facing edges of the gap become engaged while the portion of the first blade is being deflected by the wire. If the facing edges are not engaged (NO at step 406), as in the case of a wire whose diameter is less than a maximum deflection threshold of the first flex region, the portion of the first blade continues to deflect until the wire is terminated in the gap. Alternatively, if the facing edges of the gap become engaged during deflection (YES at step 406), as in the case of a wire whose diameter exceeds the maximum deflection threshold of the first flex region, the methodology proceeds to step 408, where the first blade is deflected away from the second blade about a second flex region located on a base region of the IDC.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

What has been described above includes examples of systems and methods illustrative of the disclosed subject matter. It is, of course, not possible to describe every combination of components or methodologies here. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. An insulation displacement contact, comprising:

a base region; and a first blade and a second blade that extend from the base region and form a slot therebetween, wherein a first hole that is wider than the slot is formed at a bottom of the slot between the first blade and the second blade, the first blade comprises a first flex region located part way along a length of the first blade between the base region and a top of the first blade, the first flex region comprises a second hole formed through the first blade and a gap that traverses from a perimeter of the second hole to an outward-facing edge of the first blade, a portion of the first blade above the first flex region flexes away from the second blade about the first flex region by a degree limited by a mechanical stop comprising facing edges of the gap, and while the mechanical stop is engaged, the first blade flexes away from the second blade about a second flex region, created by inclusion of the first hole, located on the base region at a meeting point between the first blade and the second blade.

2. The insulation displacement contact of claim 1, wherein the portion of the first blade above the first flex region is configured to flex away from the second blade until the facing edges of the gap contact one another.

3. The insulation displacement contact of claim 1, wherein the second blade comprises another first flex region located part way along a length of the second blade between the base region and a top of the second blade, and a portion of the second blade above the other first flex region is configured to flex away from the first blade about the other first flex region by a degree limited by another mechanical stop associated with the other first flex region.

4. The insulation displacement contact of claim 3, wherein the upper portion of the first blade and the upper portion of the second blade angle toward one another while the insulation displacement contact is at rest with no wire installed in the insulation displacement contact.

5. The insulation displacement contact of claim 1, wherein the first blade comprises multiple flex regions including the first flex region.

6. The insulation displacement contact of claim 1, wherein the portion of the first blade above the first flex region is configured to flex away from the second blade in response to insertion of a wire into the slot, and insertion, into the slot, of a wire having a diameter that exceeds a diameter threshold causes the mechanical stop to be engaged.

7. The insulation displacement contact of claim 1, wherein at least a portion of the slot has a width that is less than or equal to 6 mils.

8. A cable connector comprising at least one insulation displacement contact according to claim 1.

9. An insulation displacement contact, comprising:

a first blade and a second blade that extend from a base region and define a slot between respective inward-facing edges of the first blade and the second blade, wherein a first hole wider than the slot is formed at a bottom of the slot between the first blade and the second blade, in response to insertion of a wire into the slot, an upper portion of the first blade pivots away from the second blade about a first flex region formed on the first blade between the base region and a top of the first blade and located part way along a length of the first blade, wherein the first flex region comprises a second hole formed through the first blade and a gap that traverses from a perimeter of the second hole to an outward-facing edge of the first blade, and in response to engagement of a mechanical stop comprising facing edges of the gap while the upper portion of the first blade is pivoting away from the second blade, the first blade pivots away from the second blade about a second flex region that is created by inclusion of the first hole and located on the base region at a meeting point between the first blade and the second blade.

10. The insulation displacement contact of claim 9, wherein the portion of the first blade above the first flex region flexes away from the second blade until the facing edges of the gap engage, and engagement of the facing edges transfers deformation stress of the first blade from the first flex region to the second flex region.

11. The insulation displacement contact of claim 9, wherein in response to the insertion of the wire into the slot, an upper portion of the second blade pivots away from the first blade about another first flex region formed on the second blade between the base region and a top of the second blade, and in response to engagement of another mechanical stop associated with the other first flex region while the upper portion of the second blade is pivoting away from the first blade, the second blade pivots away from the first blade about the second flex region.

12. The insulation displacement contact of claim 11, wherein the upper portion of the first blade and the upper portion of the second blade angle toward one another while the insulation displacement contact is at rest and no wire is inserted in the slot.

13. The insulation displacement contact of claim 9, wherein the first blade comprises multiple flex regions including the first flex region.

14. The insulation displacement contact of claim 9, wherein at least a portion of the slot has a width that is less than or equal to 6 mils.

15. A cable connector comprising at least one insulation displacement contact according to claim 9.

16. A method, comprising:

receiving a wire in a gap between a first blade and a second blade that extend from a base region of an insulation displacement contact, wherein a first hole wider than the gap is formed at a bottom of the gap;

in response to the receiving, deflecting, about a first flex region located part way along a length of the first blade between the base region and a top of the first blade, a portion of the first blade above the first flex region, wherein the deflecting is enabled by a gap that traverses from a second hole formed through the first blade to an outward-facing edge of the first blade; and in response to engagement of facing edges of the gap during the deflecting, deflecting the first blade away from the second blade about a second flex region located on the base region at a meeting point between the first blade and the second blade and created by inclusion of the first hole.

17. The method of claim 16, further comprising, in response to the receiving of the wire, deflecting, about another first flex region located part way along a length of the second blade between the base region and a top of the second blade, a portion of the second blade above the other first flex.

18. The method of claim 17, wherein the upper portion of the first blade and the upper portion of the second blade angle toward one another while the insulation displacement contact is at rest and no wire is inserted into the gap.

19. The method of claim 17, wherein the first blade comprises multiple flex regions including the first flex region.

20. The method of claim 17, further comprising transferring in response to the engagement of the facing edges, deformation stress of the first blade from the first flex region to the second flex region.

* * * * *